Patented Feb. 28, 1939

2,148,525

UNITED STATES PATENT OFFICE 2,148,525

DEGRADATION OF CEREALS

Hans F. Bauer and Herbert F. Gardner, Chicago, Ill., assignors to Stein, Hall Manufacturing Company, Chicago, Ill., a corporation of Delaware No Drawing. Application May 22, 1936, Serial No. 81,270

7 Claims. (Cl. 127—38)

Our invention relates broadly to the degradation of cereals and to various conversion products thereof such as, for example, dextrine, starch gums and adhesive products. More specifically, our invention relates to a starch conversion process in which one or more chemicals are added to starch containing cereals to satisfy the apparent demand or tendency of the non-starchy components thereof to take up the starch converting agent so that it is not available for its intended reaction with the starch. By satisfying this demand conversion is effected with the minimum amount of starch converting agent, and products of relatively high water solubility may be produced.

We have experienced some difficulty in completely converting the starch present in cereals, particularly cereal flours, when employing the usual conversion methods and the normal amount of starch converting agent, such as, for example, hydrochloric acid. We have found that the conversion action proceeds for a time but then gradually slows down and finally stops, although theoretically a sufficient amount of hydrochloric acid was initially added to effect complete conversion. We believe as a result of various starch conversion tests, particularly the conversion of starch in cereals containing gluten and other non-starchy components, that the non-starchy components, have a tendency to take up in some manner the starch converting agents used, for example, hydrochloric acid, so that substantial amounts of the acid are withdrawn from the main or principal starch conversion reaction, and consequently the conversion reaction slows down and finally stops.

One way of minimizing or avoiding to some extent this undesirable result of incomplete conversion is to add the starch converting acid such as hydrochloric acid to the cereal continuously and uniformly in small amounts. By this procedure there is always a small but sufficient amount of acid available for the conversion of the starch, although the non-starchy components of the cereal continue to absorb or take up in some manner the converting acid, according to the availability of that acid as defined by its concentration, and according to the degree to which it has taken up the maximum amount of acid it desires. Although this procedure is helpful in some respects, it has the commercial disadvantage of requiring the addition of acid to the cereal after the latter has been heated to the relatively high converting temperatures of approximately 250° F. to 420° F., which results in the formation of an unnecessary large amount of grits.

In accordance with the present invention, we have discovered and developed a method and means for adding other materials as explained below, whereby complete conversion is effected in the most efficient manner and with a minimum amount of starch conversion accelerating acid or other agent used. These new means and method offer substantial advantages over the avoidance method mentioned above, since they act to satisfy, instead of attempting to avoid, the attraction or "hunger" of the non-starchy components of the cereal for the converting acid. Consequently, this demand or "hunger" is effectively eliminated.

Our observations of the inefficient conversion action that normally takes place when cereals are treated with only a normal amount of a starch converting agent led us to the belief that, if suitable additional materials are added to the cereal being converted, which materials will satisfy this demand or "hunger" for the conversion acid, then the starch converting acid will be at all times available and useful for its intended conversion reaction. By making a number of practical tests we have discovered that there are several classes of these "hunger" satisfying materials one or more of which may be added to the cereal in relatively small amounts to effect the desired result. These satisfying materials may be classified into three general classes as follows:

1. Acids other than the starch converting acid, e. g. oxalic acid, boric acid, acetic acid, lactic acid, proprionic acid, formic acid, etc.

2. Aldehydes, e. g. formaldehyde, acetaldehyde, furfurol, etc.

3. Salts, e. g. copper chloride, nickel chloride, cobalt chloride, etc.

It is to be understood, of course, that the specific acids, aldehydes, and salts given above are for the purposes of illustration only and are not intended to limit the scope of this invention to the use of these specific materials, since a number of other acids, aldehydes, and salts may be used.

It is realized that acids, and salts have been used before as starch conversion agents but as far as we know neither these nor any other chemicals have been used as satisfying agents as herein described.

In addition to the usefulness of these added materials to reduce the amount of starch converting agent necessary to carry out the conversion reaction, we have found that the final converted products produced have a much higher solubility than the converted products produced by the regular process in which none of these additional agents is used.

While we do not wish to limit our invention to any theoretical explanation of how or why these added materials perform the desired functions, we believe that in the usual starch conversion process a substantial amount of the ordinary starch converting agents such as, for example, hydrochloric acid, is taken out of the principal reaction and held in some physical or possibly chemical combination by one or any or all of the non-starchy components of the cereal. One possible explanation that has suggested itself is that the proteins present in the treated cereals form what might be called organic salts with the starch converting acid and that in this way the starch converting acid or catalyzer is taken out of the principal reaction.

Our theory showing the need for a satisfying agent for the non-starchy components of the cereal may be explained in the following manner, referring first, by way of explanation, to the general starch conversion process:

The conversion of starch by the use of, e. g. hydrochloric acid has been considered a catalytic process. In the manufacture of a high soluble dextrine from ordinary starch we might use for example 0.15% or 0.33% of 18° Baumé hydrochloric acid diluted to various dilutions with water, e. g. 5° Baumé and spray the diluted acid into cold dry starch. By dry starch we mean starch containing the normal amount of moisture. The starch is then gradually heated in a steel converting drum with constant agitation until the final temperature of the finished product may be anywhere from 300° to 400° F. As this process goes on, the hydrochloric acid becomes more and more evenly distributed, being aided by the mechanical agitation, the heat, and its own vapor pressure. Considerable acid escapes into the open air. No doubt, a large part of the remaining acid is held by the starch by the forces of adsorption, while some is free.

According to the laws of adsorption, as the temperature rises the amount of hydrochloric adsorbed by the starch would be less and less. As the hydrochloric acid converts the starch, there may be momentary chemical combination of the acid with the starch, then the acid is again released, or the acid may just act as a contact catalyst.

From the above a useful generalization may be made, i. e. as far as the starch is concerned, the acid is in a relatively free state and is in constant motion. In the amounts used above on ordinary starch, a satisfactory high soluble dextrine may be obtained. Since the acid is in a relatively free state in the starch, it can readily be seen that if a substance is present that will combine with it and permanently keep it from the gaseous state, the concentration of the acid will be continually lowered, and the remaining acid will continue to distribute itself uniformly throughout the mixture except insofar, as it is held by adsorption. As the concentration of the acid is lowered it will become more and more inefficient in converting the starch.

Proteins are generally conceded to be amphoteric in nature, i. e. they combine with either acids or bases. Some of the older theories hold that the acid or base or both as in the case of a salt, are held by adsorption. However, that may be, we have found by experiment that the non-starchy components of, for example, a wheat flour containing 9% protein, adsorb or combine with roughly 15 times as much hydrochloric acid as is required for an ordinary starch conversion. While we believe that this is due mainly to the action of the various proteins present we do not wish to limit ourselves to them. For example, we have shown in our experiments that if the reaction is carried on too long or at too high a temperature with hydrochloric acid, the hydrochloric acid will react with pentosans present to form furfural; which not only uses up the hydrochloric acid, but the furfural in turn reacts with the proteins rendering them insoluble. This latter point may or may not be undesirable, it being dependent upon the end product desired. We merely wish to point out that any or all of the non-starchy components of the cereal may be responsible in varying degree for the permanent removal of the starch converting acid from the desired field of action.

Considering the above it can readily be seen why the conversion of the starch present in the cereal to the desired end could not be accomplished unless continuous additions of starch converting acid or catalyzer were made.

Another way of visualizing this phenomenon is that the reactive groups in the gluten molecule, that is, the mixture of proteins taken as a group and perhaps other components of the cereal, must be satisfied before the conversion of the starch can proceed uninterruptedly. In the usual conversion process one of the common acids, for example, hydrochloric acid, nitric acid, hydrobromic acid, etc. is added to effect the conversion of the starch in the cereal. However, if one of these acids is used alone, as is usually the case, sufficient quantities of the acid must be added to satisfy these reactive groups in the gluten molecule. If insufficient quantities of acid are added, the acid is gradually absorbed from the starch by the gluten molecule and consequently, the conversion slows down and finally stops. We have found, as above suggested, that this undesirable result can be overcome by utilizing, in addition to the starch converting acids, more or less stable products or products which apparently go into some kind of combination with any or all of the non-starchy elements making up the cereal. By following this procedure, the desired optimum results in conversion products may be achieved using the ordinary methods and the ordinary starch converting agents or catalyzers used in dextrinization processes.

It is to be clearly understood that our invention is not limited or dependent upon the possible explanations given above by way of illustration, but depends for its novelty upon the established fact that by adding to the cereal to be converted one or more additional agents of the type described above, substantially lesser amounts of the actual starch converting agents are required and improved products of high solubility are produced.

The process of our invention may be applied to starches of high protein content or to various cereal and grain flours containing starchy and non-starchy components. We believe it to be especially adaptable to those grains containing substantial amounts of proteins, gluten, etc.

Our invention applies to starch conversion processes that are carried out under (a) completely dry conditions, and under (b) relatively dry conditions, i. e. under conditions where the cereal contains normal quantities of moisture or slightly more.

While it is apparent that our invention may be applied to conversion processes regardless of the amount of moisture present, we believe that it is more particularly adaptable to processes employing the above mentioned limited amounts of moisture conducive to gel formation. Processes for carrying out conversion under limited moisture conditions and utilizing gel-inhibiting agents such as sulphur dioxide or sulphur dioxide liberating salts to prevent the formation of gels are disclosed in the Hans F. Bauer Patents No. 1,938,574 issued December 12, 1933 and No. 1,969,347, issued August 7, 1934. We have found that the satisfying agents of the present invention may be used advantageously in combination with the gel-inhibiting agents disclosed in these two patents and that superior conversion products may be produced by carrying out the conversion processes in the presence of these two types of agents under the limited moisture conditions.

For purposes of illustrating the operation of our invention but in no manner to act as limitations thereto, we give below several specific illustrative examples.

*Example I*

Put 1,000 pounds of wheat flour in one of the common types of starch converters. Add two pounds of sodium bisulphite. Raise the temperature of the mixture to 120° F. and maintain that temperature for one-half hour. To this mixture is added 15 pounds of 18° Baumé hydrochloric acid diluted down to 9° Baumé and to which 85 grams of copper chloride has been added. The temperature is then raised to the usual converting temperature and maintained until the solubility desired is attained. The final product shows a decided improvement in solubility over products prepared according to the well known processes.

*Example II*

Put 1,000 pounds of wheat flour in one of the common types of starch converters. Add thereto two pounds of sodium bisulphite. Raise the temperature of the mixture to 120° F. and maintain that temperature for one-half hour. To this mixture is added 15 pounds of 18° Baumé hydrochloric acid mixed with 50 pounds of boric acid. The temperature of this final mixture is brought up slowly to the usual conversion temperature and maintained until any desired solubility of the final product is obtained.

*Example III*

Put 1,000 pounds of corn flour in one of the common types of starch converters. Add to this 5½ pounds of 18° Baumé muriatic acid diluted to 10° Bé. and mixed with 50 pounds of boric acid. The temperature of this mixture is brought up gradually to the usual converting temperatures and maintained there until the desired solubility is obtained.

In the ordinary starch conversion process the equivalent of ½ pound to 5 pounds per 1,000 pounds of starch, of 18° Baumé hydrochloric acid, is the general range of usage. In the usual conversion process employing flour containing starchy and non-starchy components as the treated material, the equivalent of from 5 pounds to 40 pounds of 18° Baumé hydrochloric acid per 1,000 pounds of flour is the usual range. In both of these examples, we might have added, in accordance with our invention, approximately 0.02% to 1% of the satisfying agents described above instead of the amounts specified. The exact amount we use depends largely upon the properties desired in the finished product. When our satisfying agents are present in such amounts, the amount of hydrochloric acid required to produce the same degree of conversion produced in the regular process may be decreased from approximately 2.5% 18° Bé. HCl to ½% 18° Bé. HCl.

We have found that if an aldehyde is used as the satisfying agent or if continuous, gradual and small additions of the starch conversion mineral acid are made as described above, the end product will have a granular, unclear, and heterogeneous appearance. If, on the other hand, a metallic salt, such as copper chloride, or an acid such as boric acid, is used, an entirely differently appearing product is produced, which, of course, has different characteristics. If, for example, boric acid is used as the satisfying agent, the end product is a soft homogeneous paste, and if copper chloride is used the characteristics of the end product are between those of the boric acid and aldehyde treated products. Thus the characteristics of the end products are considerably influenced or modified by the substances used as satisfying agents. It may be that the satisfying agent either absorbs, combines, forms addition products, precipitates, or goes through any possible multiplicity of chemical reactions with the several components of the cereal to alter the characteristics of the final converted product. Therefore, we do not wish our invention to be limited to any particular explanation of the function of these so-called satisfying agents or their possible reaction or coaction with the several components of the cereal.

It will be understood, of course, that one of the principal motivating reasons for using one or all or any specific combination of the satisfying agents and methods described above, is to produce the desired type of end product and the purpose for which the product is required.

As suggested above, our invention may be utilized in the production of various dextrines, sugars, adhesives, and like products. On the other hand, it may also be used in a process in which conversion is not carried to the point of producing dextrines and like materials but is carried only to the point of rendering the starch slightly soluble. The invention may also be utilized in the production of a dextrinized cereal ingredient for bread, cakes, and other edible products in which a dextrinized starch product is desirable. In this case, of course, a satisfying agent of non-harmful nature, e. g. acetic acid, should be used.

It is to be understood that the term "cereals" as used in the specification and claims, includes all grains and other vegetable substances containing substantial amounts of starch, such as wheat, rye, corn, rice, peas, beans, and similar substances, either in milled, coarsely broken, or cracked condition.

Likewise, it is to be understood that the term "satisfying agent" as used in the specification and claims, refers to any and all suitable substances that will insure complete conversion of the starchy components of the treated material in the most efficient manner, with the minimum amount of starch converting agent, and without interference by any of the non-starchy components with the desired action of the converting agent upon the starchy components.

In such a case where the starch converting catalyst is introduced in the form of a gas, e. g. gaseous hydrochloric acid, then an excess of the starch converting catalyst would function as a satisfying agent for the non-starchy components of the cereal.

The term gel-inhibiting agent as used in the specification and claims refers to any and all of the gel-inhibiting agents disclosed in the Hans F. Bauer Patents Nos. 1,938,754 and 1,969,347, supra.

Our invention is not to be limited to the foregoing description and the specific examples given by way of illustration, but is subject to various modifications and changes that will occur to those skilled in this art. A number of the novel features of our invention are set forth with particularity in the appended claims.

What we claim is:

1. The method of converting starch in cereals containing starchy and non-starchy components comprising adding to said cereals a starch converting catalyst to convert said starchy components, adding an aldehyde to satisfy the attraction of the non-starchy components for said catalyst and heating whereby said starch conversion catalyst is used for that purpose only and a high degree of starch conversion efficiency is obtained.

2. The method of dextrinizing starch in cereals containing starchy and non-starchy components comprising adding to said cereals a starch converting catalyst to convert said starchy components, adding formaldehyde to satisfy the attraction of the non-starchy components for said catalyst and heating, whereby said starch conversion catalyst is used for that purpose only and a high degree of starch conversion efficiency is obtained.

3. The method of converting starch in cereals containing starchy and non-starchy components, comprising adding to said cereals a starch converting catalyst for converting said starchy components in the cereals, adding a chemical compound having the property of satisfying the attraction of said non-starchy components of the cereals for the starch converting catalyst, and heating, whereby the starch converting catalyst is not absorbed by the non-starchy components and is available in its entirety so as to effect a rapid conversion of the starch with a minimum amount of the catalyst.

4. The method of converting starch in cereals containing starchy and non-starchy components, comprising adding to said cereals ¼ to 2% of a starch converting catalyst and from ½ to 10% of a chemical compound having the property of satisfying the attraction of said non-starchy components of the cereals for the starch converting catalyst, and heating, whereby the starch converting catalyst is not absorbed by the non-starchy components and is available in its entirety so as to effect a rapid conversion of the starch with a minimum amount of the catalyst.

5. The method of dextrinizing starch in cereals containing starchy and non-starchy components under limited moisture conditions conducive to the formation of gels, comprising adding to said cereals a gel-inhibiting agent, a starch converting catalyst for converting said starchy components of the cereal, and a chemical compound having the property of satisfying the attraction of said non-starchy components of the cereals for the starch converting catalyst, and heating, whereby the starch converting catalyst is not absorbed by the non-starchy components and is available in its entirety so as to effect a rapid conversion of the starch with a minimum amount of the catalyst.

6. The method of dextrinizing starch in cereals containing starchy and non-starchy components under limited moisture conditions conducive to the formation of gels, comprising adding to said cereals a gel-inhibiting agent, a starch converting catalyst for converting said starchy components of the cereal, and an aldehyde for satisfying the attraction of said non-starchy components of the cereals for the starch converting catalyst, and heating, whereby the starch converting catalyst is not absorbed by the non-starchy components and is available in its entirety to effect a rapid conversion of the starch with a minimum amount of the same.

7. The method of dextrinizing starch in cereals containing starchy and non-starchy components under limited moisture conditions conducive to the formation of gels, comprising adding to said cereals a gel-inhibiting agent, a starch converting catalyst for converting said starchy components of the cereal, and formaldehyde for satisfying the attraction of said non-starchy components of the cereals for the starch converting catalyst, and heating, whereby the starch converting catalyst is not absorbed by the non-starchy components and is available in its entirety to effect a rapid conversion in a minimum amount of the same.

HANS F. BAUER.
HERBERT F. GARDNER.